(12) United States Patent
Chhillar et al.

(10) Patent No.: US 10,097,306 B1
(45) Date of Patent: Oct. 9, 2018

(54) PATH COMPUTATION SYSTEMS AND METHODS IN CONTROL PLANE BASED NETWORKS FOR PHOTONIC LAYER TOPOLOGIES

(71) Applicant: Ciena Corporation, Hanover, MD (US)

(72) Inventors: Mohit Chhillar, Delhi (IN); Seemant Bisht, New Delhi (IN); Anurag Prakash, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/843,081

(22) Filed: Dec. 15, 2017

(30) Foreign Application Priority Data

Nov. 2, 2017 (IN) .............................. 201711039129

(51) Int. Cl.
*H04B 10/27* (2013.01)
*H04J 14/02* (2006.01)

(52) U.S. Cl.
CPC .......... *H04J 14/0227* (2013.01); *H04B 10/27* (2013.01)

(58) Field of Classification Search
CPC .................................................... H04B 10/27
See application file for complete search history.

(56) References Cited

U.S. PATENT DOCUMENTS

| 2009/0133105 A1* | 5/2009 | Larsen | H04L 45/26 726/5 |
| 2016/0105380 A1* | 4/2016 | Chhillar | H04L 47/72 370/244 |

\* cited by examiner

*Primary Examiner* — Shi K Li
(74) *Attorney, Agent, or Firm* — Clements Bernard Walker PLLC; Christopher L. Bernard; Lawrence A. Baratta, Jr.

(57) ABSTRACT

Systems and methods of path computation and setup via a control plane in a network with partial connectivity in a photonic layer include responsive to one or more nodes in the photonic layer having partial connectivity, receiving connectivity information of the one or more nodes in signaling messages at an originating node providing setup messages; storing the connectivity information of the one or more nodes and utilizing the connectivity information for path computation; after path setup of a service through the one or more nodes, periodically sending probe signaling messages over the service; and receiving probe response messages containing updated connectivity information of the one or more nodes and storing the updated connectivity information.

20 Claims, 7 Drawing Sheets

PATH COMPUTATION SYSTEMS AND METHODS IN CONTROL PLANE BASED NETWORKS FOR PHOTONIC LAYER TOPOLOGIES

FIELD OF THE DISCLOSURE

The present disclosure generally relates to networking systems and methods. More particularly, the present disclosure relates to path computation systems and methods in control plane based networks for photonic layer topologies, including partial connectivity in the photonic layer.

BACKGROUND OF THE DISCLOSURE

Optical (i.e., transport) networks and the like (e.g., Dense Wavelength Division Multiplexed (DWDM), Optical Transport Network (OTN), Ethernet, and the like) at various layers are deploying control plane systems and methods. Control planes provide automatic allocation and management of network resources in an end-to-end manner. Example control planes may include Automatically Switched Optical Network (ASON) as defined in ITU-T G.8080/Y.1304, Architecture for the automatically switched optical network (ASON) (February 2005), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween. Control planes are configured to establish end-to-end signaled connections such as Subnetwork Connections (SNCs) in ASON or OSRP, and Label Switched Paths (LSPs) in GMPLS and MPLS. Control planes are configured to compute paths, to route/signal the SNCs/LSPs, and program the underlying hardware accordingly.

As part of path computation, the control plane requires the distribution of the network topology to all participating nodes. At the photonic layer (Layer 0), there is a configuration where drop ports (Optical Channel (OCH)) are not connected/fibered to all line ports (Optical Multiplex Section (OMS)). This information is required by the control plane to compute and program paths properly. The conventional approach in control plane networks is to broadcast the complete connectivity at the photonic layer, i.e., OMS<>OMS and OMS<>OCH ports along with the corresponding spectral constraints (available/used wavelengths, spectrum, etc.). Disadvantageously, this leads to a large amount of flooding across the control plane network because there can be a large number of ports on the access side. That is, flooding of connectivity between OMS and OCH significantly increases the routing database size leading to higher congestion and lower performance.

BRIEF SUMMARY OF THE DISCLOSURE

In an embodiment, a method of path computation and setup via a control plane in a network with partial connectivity in a photonic layer includes, responsive to one or more nodes in the photonic layer having partial connectivity, receiving connectivity information of the one or more nodes in signaling messages at an originating node providing setup messages; storing the connectivity information of the one or more nodes and utilizing the connectivity information for path computation; after path setup of a service through the one or more nodes, periodically sending probe signaling messages over the service; and receiving probe response messages containing updated connectivity information of the one or more nodes and storing the updated connectivity information. The method can include updating one or more protect routes for the service based on the updated connectivity information. The partial connectivity can include a direct attach port which is an Optical Channel (OCH) which is not connected to all Optical Multiplex Section (OMS) ports at a node. The partial connectivity can include regenerator banks with constrained connectivity in the photonic layer. The photonic layer topology including drop port connectivity is not flooded in the control plane. The periodically sending can be sent on an order of several minutes. The method can further include, prior to providing the setup messages, performing path computation assuming full connectivity in the photonic layer; and, responsive to the receiving connectivity information of the one or more nodes with the partial connectivity, updating the path computation based on the connectivity information.

In another embodiment, a node in a network with partial connectivity in a photonic layer includes one or more ports; and a controller operating a control plane, communicatively coupled to the one or more ports, and configured to, responsive to one or more nodes in the photonic layer having partial connectivity, receive connectivity information of the one or more nodes in signaling messages responsive to sent setup messages; store the connectivity information of the one or more nodes and utilize the connectivity information for path computation; after path setup of a service through the one or more nodes, periodically send probe signaling messages over the service; and receive probe response messages containing updated connectivity information of the one or more nodes and store the updated connectivity information. The controller can be further configured to update one or more protect routes for the service based on the updated connectivity information. The partial connectivity can include a direct attach port which is an Optical Channel (OCH) which is not connected to all Optical Multiplex Section (OMS) ports at a node. The partial connectivity can include regenerator banks with constrained connectivity in the photonic layer. The photonic layer topology including drop port connectivity is not flooded in the control plane. The periodically sending can be sent on an order of several minutes. The controller can be further configured to, prior to providing the setup messages, performing path computation assuming full connectivity in the photonic layer; and, responsive to the receiving connectivity information of the one or more nodes with the partial connectivity, updating the path computation based on the connectivity information.

In a further embodiment, a network with partial connectivity in a photonic layer includes an originating node; one or more intermediate nodes; and a terminating node communicatively coupled to the originating node and the one or more intermediate nodes, wherein, responsive to one or more nodes in the photonic layer having partial connectivity of the one or more intermediate nodes or the terminating node, the originating node receives connectivity information of the one or more nodes in signaling messages responsive to sent setup messages, wherein, the originating node stores the connectivity information of the one or more nodes and utilize the connectivity information for path computation, wherein, after path setup of a service through the one or more nodes, the originating node periodically sends probe signaling messages over the service, and wherein the originating node receives probe response messages containing updated connectivity information of the one or more nodes and stores the updated connectivity information. The originating node can be configured to update one or more protect routes for the service based on the updated connectivity information. The partial connectivity can include a direct attach port which is an Optical Channel (OCH) which is not connected to all Optical Multiplex Section (OMS) ports at a node. The partial connectivity can include regenerator banks with constrained connectivity in the photonic layer. The photonic layer topology including drop port connectivity is not flooded in the control plane. The originating node can periodically send probe signaling messages on an order of several minutes.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to path computation systems and methods in control plane based networks for photonic layer topologies, including partial connectivity in the photonic layer. As defined herein, the photonic layer may have connectivity constraints including partial connectivity via direct attached ports. The direct attached ports in the photonic layer are where drop ports (Optical Channel (OCH)) are not connected/fibered to all line ports (Optical Multiplex Section (OMS)). The systems and methods obtain/provide the connectivity constraints for a photonic network (such as port trails, direct attach configurations, or/and spectral continuity) without flooding such information in the control plane network. The photonic layer information is determined by performing an audit of a path instead of flooding such information from each node. The photonic layer information is used to calculate, pre-calculate, etc. work and potential protect paths for services.

Optical Network

Figure 1:
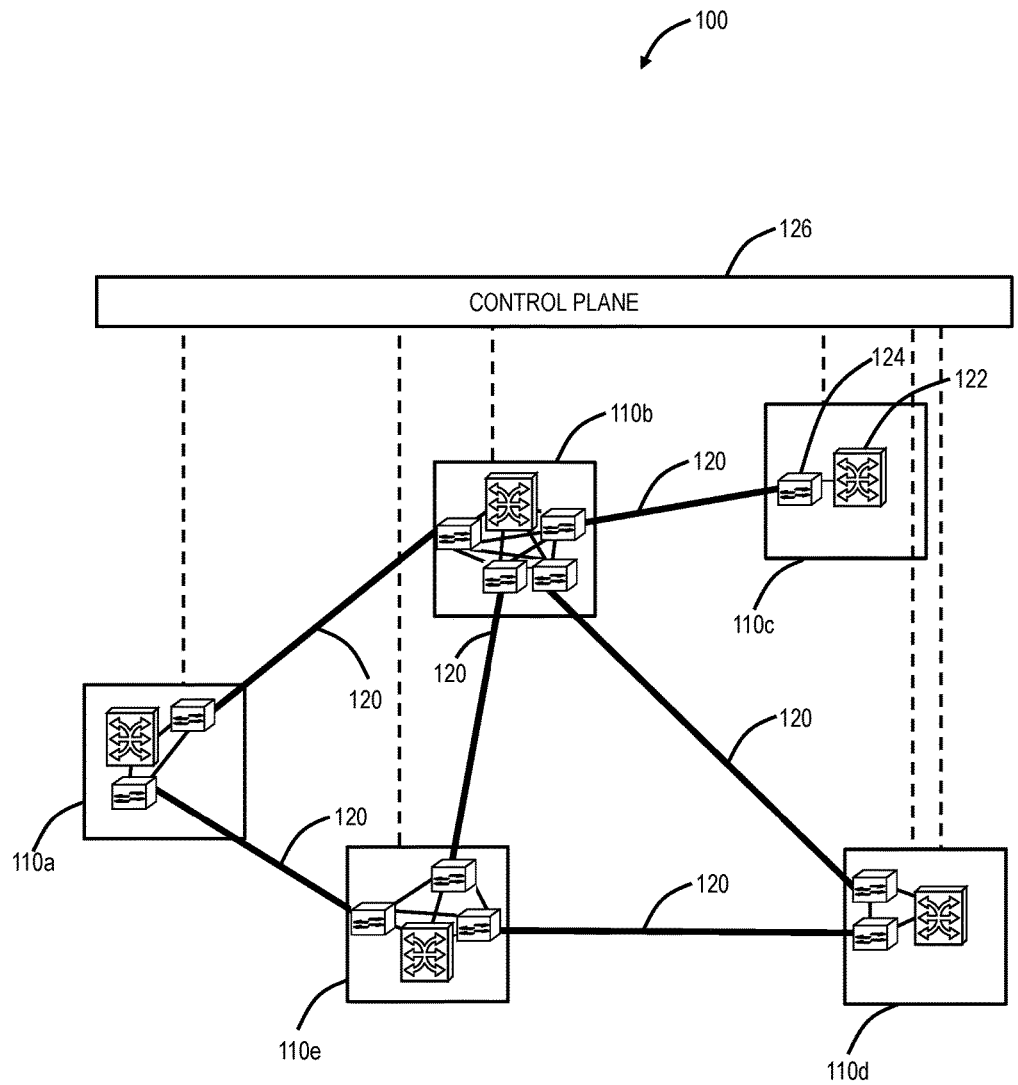
FIG. 1 is a network diagram of an example optical network with five interconnected sites.

FIG. 1 is a network diagram of an example optical network 100 with five interconnected sites 110a, 110b, 110c, 110d, 110e. The sites 110 are interconnected by a plurality of links 120. Each of the sites 110 can include a switch 122 and one or more Wavelength Division Multiplexed (WDM) network elements 124. The switch 122 is configured to provide services at Layer 0 (DWDM, photonic), Layer 1 (e.g., Optical Transport Network (OTN)), and/or Layer 2 (e.g., Ethernet). The WDM network elements 124 provide the photonic layer (i.e., Layer 0) and various functionality associated therewith (e.g., multiplexing, amplification, optical routing, wavelength conversion/regeneration, local add/drop, etc.) including photonic control. Of note, while shown separately, those of ordinary skill in the art would understand the switch 122 and the WDM network elements 124 may be realized in the same network element or each in multiple network elements. The photonic layer can also include intermediate amplifiers and/or regenerators on the links 120 which are omitted for illustration purposes. The optical network 100 is illustrated, for example, as an interconnected mesh network, and those of ordinary skill in the art will recognize the optical network 100 can include other architectures, with additional sites 110 or with fewer sites 110, with additional network elements and hardware, etc. The optical network 100 is presented herein as an example for implementing the path computation systems and methods.

The sites 110 communicate with one another optically over the links 120. The sites 110 can be network elements which include a plurality of ingress and egress ports forming the links 120. Further, the sites 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes 110 at each particular node 110. The network 100 includes a control plane 126 operating on and/or between the switches 122 and/or the WDM network elements 124 at the sites 110a, 110b, 110c, 110d, 110e. The control plane 126 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an embodiment, the control plane 126 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100 and the control plane 126 can utilize any type control plane for controlling the switches 122 and/or the WDM network elements 124 and establishing connections.

Example Network Element/Node

Figure 2:
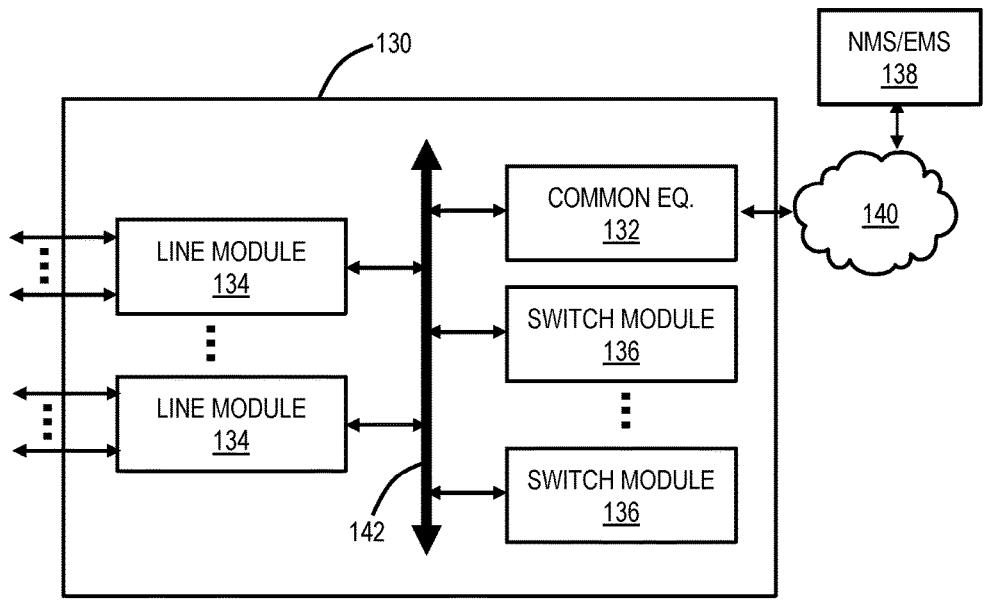
FIG. 2 is a block diagram of a node for use with the systems and methods described herein.

FIG. 2 is a block diagram of a node 130 for use with the systems and methods described herein. The node 130 can be the switch 122, the WDM network element 124, or the like. In an embodiment, the node 130 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the node 130 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 130 can be a system with ingress and egress digital signals and switching of channels, timeslots, tributary units, etc. Also, the node 130 can be a system with ingress and egress of optical signals and switching/routing of wavelengths. Of course, the node 130 can combine both digital signals and optical signals. While the node 130 is generally shown as an optical network element, the systems and methods contemplated for use with any switching fabric, network element, or control plane network based thereon.

The node 130 can include common equipment 132, one or more line modules 134, and one or more switch modules 136. The common equipment 132 can include power; a control module; Operations, Administration, Maintenance, and Provisioning (OAM&P) access; user interface ports; and the like. The common equipment 132 can connect to a management system 138 through a data communication network 140 (as well as a Path Computation Element (PCE), Software Defined Networking (SDN) controller, OpenFlow controller, etc.). The management system 138 can include a Network Management System (NMS), Element Management System (EMS), or the like. Additionally, the common equipment 132 can include a control plane processor, such as a controller 150 illustrated in FIG. 3 configured to operate the control plane as described herein. The node 130 can include an interface 142 for communicatively coupling the common equipment 132, the line modules 134, and the switch modules 136 to one another. For example, the interface 142 can be a backplane, midplane, a bus, optical or electrical connectors, or the like. The line modules 134 are configured to provide ingress and egress to the switch modules 136 and to external connections on the links to/from the node 130. In an embodiment, the line modules 134 can form ingress and egress switches with the switch modules 136 as center stage switches for a three-stage switch, e.g., a three-stage Clos switch. Other configurations and/or architectures are also contemplated.

The line modules 134 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, OTUCn, Flexible Ethernet, etc. Further, the line modules 134 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 134 can include wavelength division multiplexing interfaces, short reach interfaces, and the like, and can connect to other line modules 134 on remote network elements, end clients, edge routers, and the like, e.g., forming connections on the links in the network 100. From a logical perspective, the line modules 134 provide ingress and egress ports to the node 130, and each line module 134 can include one or more physical ports. The switch modules 136 are configured to switch channels, timeslots, tributary units, packets, etc. between the line modules 134. For example, the switch modules 136 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 136 can include Time Division Multiplexed (TDM) (i.e., circuit switching) and/or packet switching engines. The switch modules 136 can include redundancy as well, such as 1:1, 1:N, etc.

Those of ordinary skill in the art will recognize the node 130 can include other components which are omitted for illustration purposes, and that the systems and methods described herein are contemplated for use with a plurality of different network elements with the node 130 presented as an example of a type of network element. For example, in another embodiment, the node 130 may not include the switch modules 316, but rather have the corresponding functionality in the line modules 134 (or some equivalent) in a distributed fashion. For the node 130, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 130 is merely presented as one example of node 130 for the systems and methods described herein.

Controller

Figure 3:
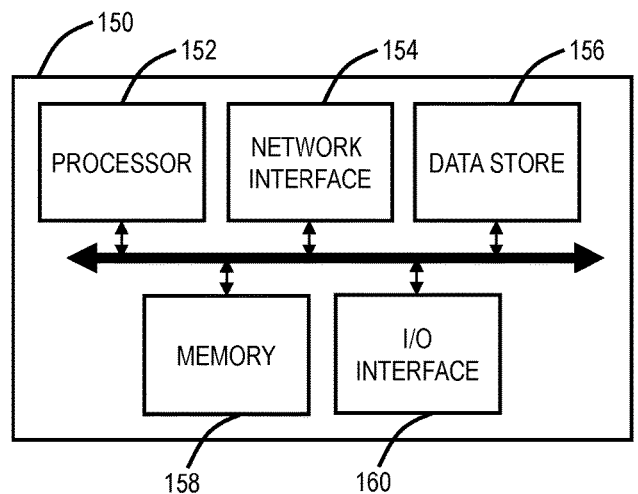
FIG. 3 is a block diagram of a controller to provide control plane processing and/or Operations, Administration, Maintenance, and Provisioning (OAM&P) for the node of FIG. 2.

FIG. 3 is a block diagram of a controller 150 to provide control plane processing and/or OAM&P for the node 130. The controller 150 can be part of the common equipment, such as common equipment 132 in the node 130, or a stand-alone device communicatively coupled to the node 130 via the DCN 140. The controller 150 can include a processor 152 which is a hardware device for executing software instructions such as operating the control plane. The processor 152 can be any custom made or commercially available processor, a central processing unit (CPU), an auxiliary processor among several processors associated with the controller 150, a semiconductor-based microprocessor (in the form of a microchip or chip set), or generally any device for executing software instructions. When the controller 150 is in operation, the processor 152 is configured to execute software stored within the memory, to communicate data to and from memory 158, and to generally control operations of the controller 150 pursuant to the software instructions. The controller 150 can also include a network interface 154, a data store 156, memory 158, an I/O interface 160, and the like, all of which are communicatively coupled to one another and to the processor 152.

The network interface 154 can be used to enable the controller 150 to communicate on the DCN 140, such as to communicate control plane information to other controllers, to the management system 138, to the nodes 130, and the like. The network interface 154 can include, for example, an Ethernet card (e.g., 10BaseT, Fast Ethernet, Gigabit Ethernet) or a wireless local area network (WLAN) card (e.g., 802.11). The network interface 154 can include address, control, and/or data connections to enable appropriate communications on the network 140. The data store 156 can be used to store data, such as control plane information, provisioning data, OAM&P data, etc. The data store 156 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 156 can incorporate electronic, magnetic, optical, and/or other types of storage media. The memory 158 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 158 may incorporate electronic, magnetic, optical, and/or other types of storage media. Note that the memory 158 can have a distributed architecture, where various components are situated remotely from one another but may be accessed by the processor 152. The I/O interface 160 includes components for the controller 150 to communicate with other devices. Further, the I/O interface 160 includes components for the controller 150 to communicate with the other controllers/nodes, such as using overhead associated with TDM signals.

The controller 150 can be configured to communicate with other controllers 150 in the network 100 to operate the control plane 126 and for control plane signaling. This communication may be either in-band or out-of-band. For SONET networks and similarly for SDH networks, the controllers 150 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an embodiment, the controllers 150 can include an in-band signaling mechanism utilizing OTN overhead. The General Communication Channels (GCC) defined by ITU-T Recommendation G.709 are in-band side channels used to carry transmission management and signaling information within Optical Transport Network elements. For example, the GCC may be used for in-band signaling or routing to carry control plane traffic. Based on the intermediate equipment's termination layer, different bytes may be used to carry control plane signaling. Other mechanisms are also contemplated for control plane signaling.

The controller 150 is configured to operate the control plane 126 in the network 100. That is, the controller 150 is configured to implement software, processes, algorithms, etc. that control configurable features of the network 100, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 150 can include a topology database that maintains the current topology of the network 100 based on control plane signaling (e.g., HELLO messages) and a connection database that maintains available bandwidth on the links 120 again based on the control plane signaling. The control plane 126 can be a distributed control plane; thus, a plurality of the controllers 150 can act together to operate the control plane 126 using the control plane signaling to maintain database synchronization. In source-based routing, the controller 150 at a source node 110 for a connection is responsible for path computation and establishing by signaling other controllers 150 in the network 100, such as through a SETUP message. For example, the source node 110 and its controller 150 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e., traversing the links 120 through the nodes 110 from the originating node 110 to the destination node 110 based on a plurality of constraints such as administrative weights on the links, bandwidth availability on the links 120, etc.

As is described herein, the path computation systems and methods enable the controller 150 to have associated photonic information for various paths in the optical network 100 without requiring each controller 150 to flood the detailed photonic information.

Partial Connectivity in the Photonic Layer

Figure 4:
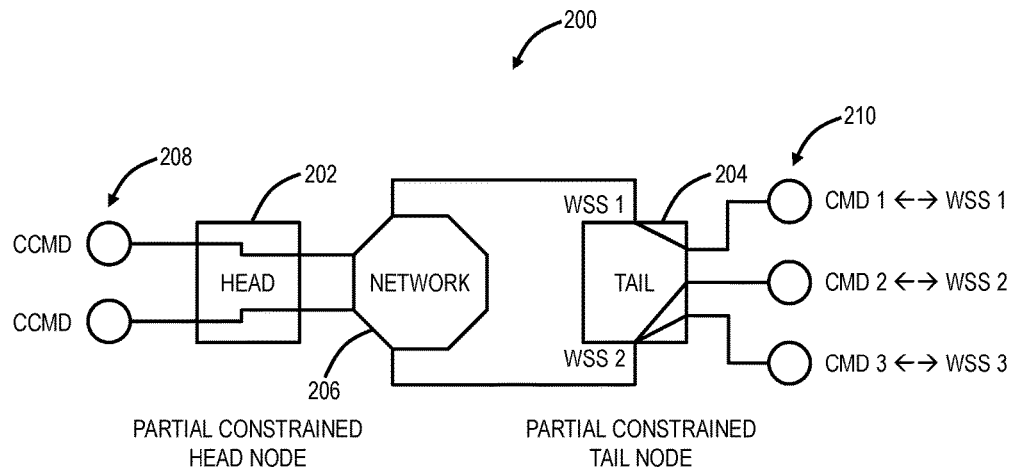
FIG. 4 is a network diagram of a network with two nodes with partial connectivity applicable to a data center interconnect application.
Figure 5:
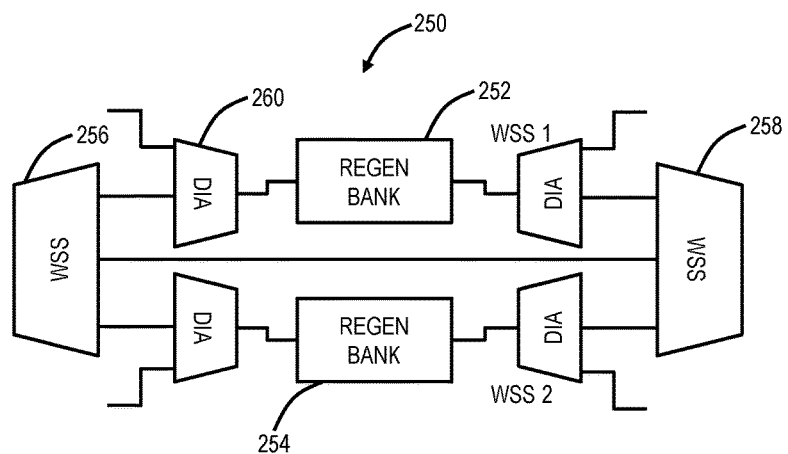
FIG. 5 is a network diagram of a network with regenerator banks in a dual Directionally Independent Access (DIA) configuration with partial connectivity towards two degrees within a node.

FIG. 4 is a network diagram of a network 200 with two nodes 202, 204 with partial connectivity applicable to a data center interconnect application. FIG. 5 is a network diagram of a network 250 with regenerator banks 252, 254 in a dual Directionally Independent Access (DIA) configuration with partial connectivity towards two degrees within a node. Specifically, the networks 200, 250 provide two examples in the photonic layer of partial connectivity.

In FIG. 4, a head node 202 is communicatively coupled to a tail node 204 via a network 206. The network 206 includes various optical components which are omitted for illustration purposes. The network 200 includes two OCH ports 208 formed by a Colorless Channel Multiplexer/Demultiplexer (CCMD) connected to the head node 202 and three OCH ports 210 formed by Channel Multiplexer/Demultiplexer (CMD) (labeled as CMD 1, CMD 2, CMD 3). The OCH ports 210 are not connected/fibered to all line (OMS) ports in the tail node 204 (the OMS formed by the Wavelength Selective Switch (WSS)). This is referred to as Colorless/Colored Direct Attach (CDA) configuration and the OCH ports 210 can be referred to as direct attached ports. The network 200 is usually deployed in configurations for data center interconnect where the network topology may be simpler but constrained on the drop side, at the OCH ports 210. Since the control plane 126 is unaware of the drop side capabilities in a network 200, this lack of this information can lead to incorrect route computation. In FIG. 5, the same issue arises on intermediate segments where the optical signal needs to be regenerated. Here, the network 250 includes the regenerator banks 252, 254 which are colorless connected to two WSSs 256, 258 via DIA devices 260.

Path Computation on a Graph

The control plane 126 can perform path computation based on knowledge of the network topology and abstracting the network topology to a graph. In the graph, the nodes can be modeled as vertices and the links modeled to edges. Costs can be assigned to each of the edges, and various different algorithms can be used to compute paths through the graph. The key requirement of the path computation is that every node in the control plane 126 performing path computation has the actual network topology. The problem with the partial connectivity in the photonic layer is there can be incomplete information or a significant amount of information.

In the path computation systems and methods, the partial connectivity constraints are learned via crankbacks and asynchronous probe requests. In the control plane 126, a crankback is when setup failure information is returned from the point of failure to allow new setup attempts to be made avoiding the blocked resources. The partial connectivity constraints can be port trails, direct attach configurations, and/or spectral continuity.

Advantageously, the crankbacks and asynchronous probe requests avoid the requirement for each node to flood the internal connectivity information at the photonic layer. The internal connectivity information can become very large to flood, e.g., in the network 250 with the dual DIA 260 and the two colorless regenerator banks 252, 254 with constraints can amount to ~10 k of data.

The crankbacks piggy-back on the convergence speed of the signaling mechanism to provide a fast and efficient mechanism to resolve routing failures. Also, it allows for dynamic convergence in case of optical equipment reconfiguration. A measure of performance of the systems and methods is the number of crankbacks needed for multiple contention points and the latency introduced by the round-trip delay of the crankback. In the systems and methods, the number of crankbacks needed would be equivalent to the points of contention.

Once this internal connectivity information is learned it can be periodically probed in the network via simple asynchronous probe messages and kept updated without flooding it across the network. This actually is a significant improvement since without flooding information, the source nodes keep themselves updated with the information from contention points in the network, on a periodic basis via a request/response mechanism instead of network broadcast from the contention points.

Path Computation Process

Figure 6:
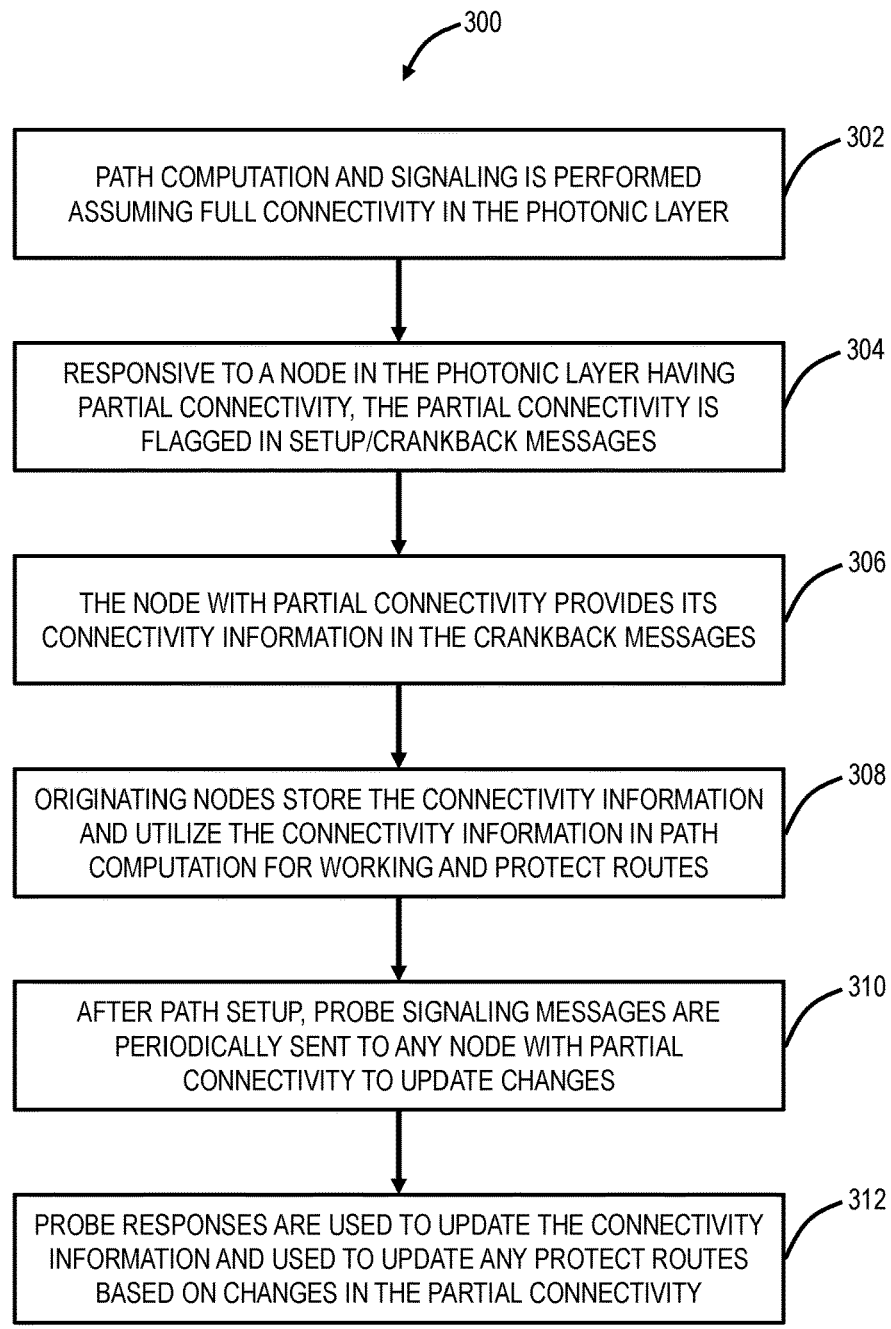
FIG. 6 is a flowchart of a path computation process via the control plane with partial connectivity in the photonic layer.

FIG. 6 is a flowchart of a path computation process 300 via the control plane 126 with partial connectivity in the photonic layer. The path computation process 300 can assume there is full connectivity in the photonic layer as the partial connectivity is not flooded but flagged in the signaling by the control plane 126 (step 302). During the signaling process for a new path, and responsive to a node in the photonic layer having partial connectivity, the partial connectivity is flagged in setup/crankback messages to signaling nodes (step 304). For example, any node with partial connectivity can be configured to affirmatively let a signaling node know of response messages—either setup messages or crankback messages (if there is a failure). Alternatively, the partial connectivity can be discovered if there is a failure in the crankback messages. That is the partial connectivity is alerted via signaling messages instead of flooding messages. Every node with partial connectivity is configured to alert each signaling node (e.g., source node).

Figure 7:
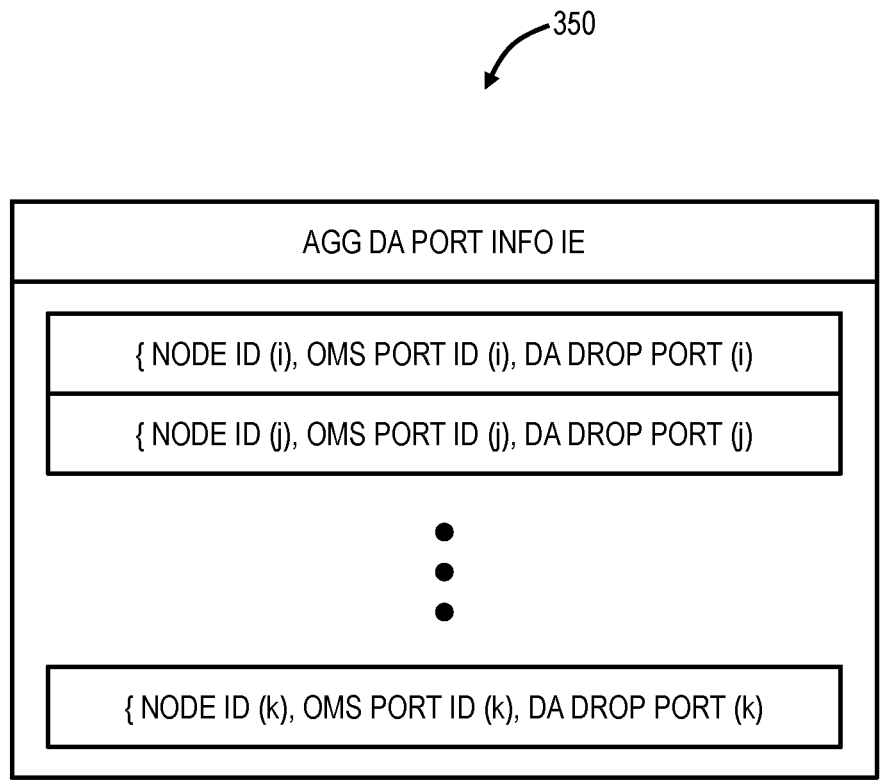
FIG. 7 is a diagram of an example Information Element (IE) which is returned to the originating node outlining the partial connectivity at a node.

The node with partial connectivity provides its connectivity information in the crankback messages (signaling messages) (step 306). Specifically, the connectivity information can be piggybacked in a reverse crankback message, a setup message, etc. and sent to the originating node, i.e., signaling node or source node. This step is performed for any node with partial connectivity in the photonic layer. FIG. 7 is a diagram of an example Information Element (IE) 350 which is returned to the originating node outlining the partial connectivity at a node. For example, the IE 350 describes a node with direct attached ports and outlines connectivity between OMS port and drop port (OCH).

Back in FIG. 6, the originating nodes receive and store the connectivity information and utilize the connectivity information in path computation for working and protect routes (step 308). That is, the originating node now is aware the network does not have full connectivity in the photonic layer and can use this information for any future path computations as well as for computing protect routes. If a selected path by a Path Computation Engine (PCE) goes through a specific inbound degree directly attached to a DA drop port on a regenerator node or terminating node, this information for the path OMS to OCH ports is provided in any CONNECT message. Also, the PCE can calculate any protect routes considering the connectivity information for each node with the partial connectivity.

After the path setup, probe signaling messages are periodically sent to any node with partial connectivity to update changes (step 310). That is, once a path is computed and setup via signaling and the various hardware configurations (cross-connections) are established, the probe signaling messages can be sent via the control plane 126 to all the nodes with partial connectivity to audit the connectivity on terminating drop ports, regenerator ports, etc. to update any connectivity changes. The probe responses are used to update the connectivity information at the originating node and can be used to update any protect routes (or new path computation) based on changes to the partial connectivity (step 312). For example, the period of the probe signaling messages can be on the order of a few minutes such as every five minutes.

The probe handling after the service is setup is similar to a background arbitration function and can have a cadence in order of 5 to 10 minutes along the route of the service. Since the complete information of a regenerator port or partial connectivity with the changing spectrum availability can vary in order of 10K to 100K per node, this minimizes the learning to the specific service. This arbitration is needed in case of any handling of any associated protection/co-routed services and redials/retunes for the same, and thus, it is cached at the head end for the same. This is analogous to resource arbitration mechanism between L1(OTN/SONET) to L2(Ethernet) as well where the L2 resource information is not available to L1, but it needs to set up the tunnels for the same. Thus, applicable in a generic way in a multi-layer network environment.

The crankback information is similar to probe information specific to partial connectivity information, spectrum availability, and regen-switching information of the same. In a multi-layer environment, this information structure may vary depending on the resources which need this arbitration.

Thus, the path computation process 300 relies on the affirmative discovery of partial connectivity via signaling (i.e., a pull mechanism) versus relying on flooding (i.e., a push mechanism). The advantage of this process is it significantly reduces the overall bandwidth of the control plane signaling as advertising photonic layer connectivity can introduce a significant amount of bandwidth. This can be thought of as an abstraction where flooding provides certain information which allows routing and resource assignment decisions on the tunnels at a server layer but the probes and crankbacks learn extra information in real-time (specifically for resource arbitration) about the network and its egress and ingress interfaces to peer/server/client network layers, especially multi-layer or multi-domain networks. It is important to learn information specific to a service due to the size of flooding and convergence delays, due to the amount of data and the dynamic nature of the same, associated with the same.

Example Operation

Figure 8:
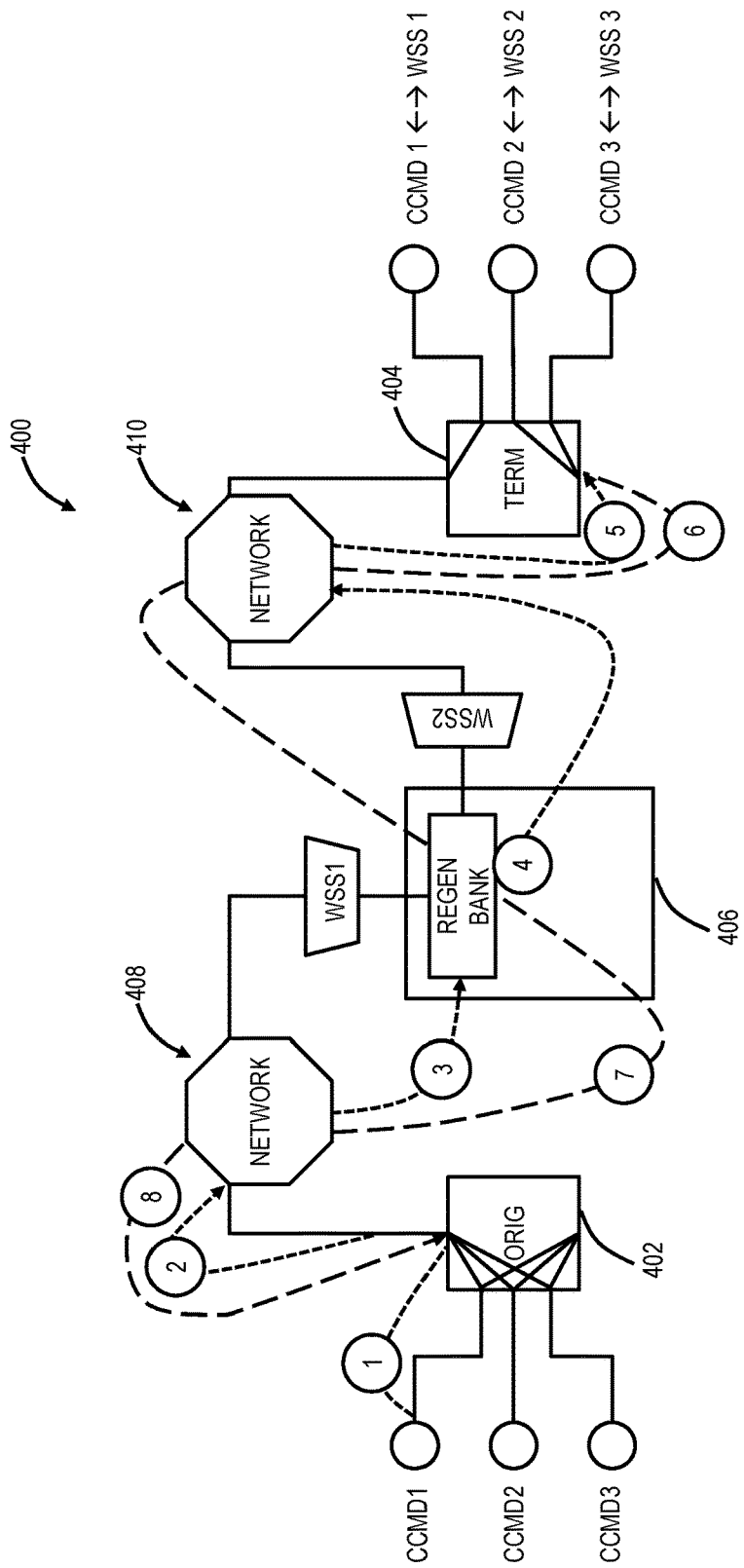
FIGS. 8 and 9 are network diagrams of a network illustrating an operation of the path computation process of FIG. 6.
Figure 9:
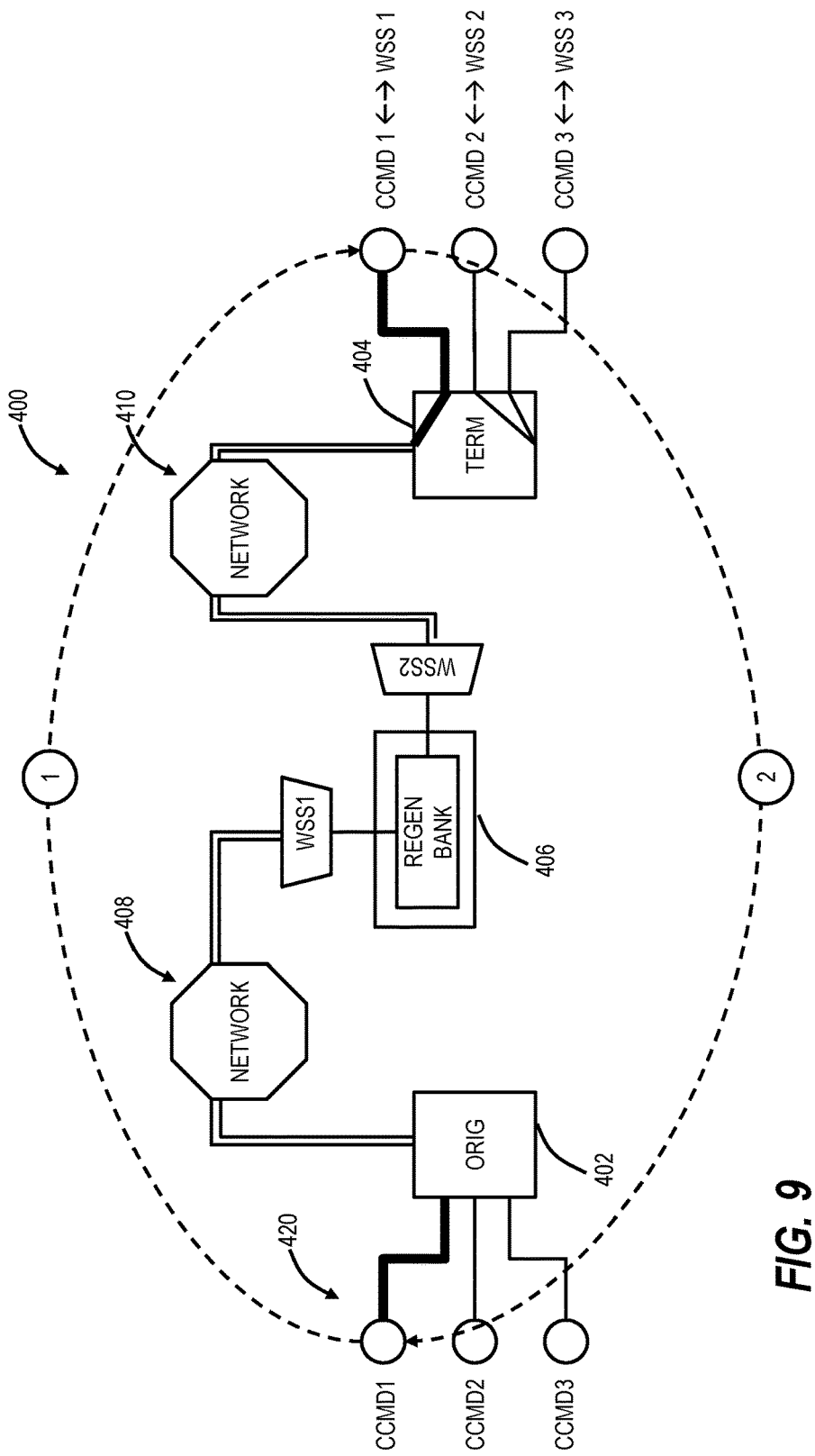

FIGS. 8 and 9 are network diagrams of a network 400 illustrating an operation of the path computation process 300. The network 400 includes an originating node 402, a terminating node 404, and a regenerator bank 406. Also, the network 400 includes portions 408, 410 of the network 400 without connectivity constraints in the photonic layer. The regenerator bank 406 and the terminating node 404 each have partial connectivity in the photonic layer. The example operation illustrates a graph transformation to calculate appropriate diverse or viable routes to the destination port. The transformation can only be performed after the received crankback information is used to create a single source to multiple destination (multiple degrees directly attached to the destination port on the terminating node 404) path computation.

FIG. 8 illustrates an operation of steps 302-308, i.e., the crankback messages, and FIG. 9 illustrates an operation of steps 310-312, i.e., the probe signaling messages and the probe response messages.

At step 1, the originating node 402 sends a CONNECT message to establish a path from the CCMD1 on the originating node 402 to the CCMD1 on the terminating node 404. At step 2, the originating node 402 sends a SETUP message to the network portion 408 based on the CONNECT message. At step 3, the network portion 408 sends the SETUP message to the regenerator bank 406, but the SETUP message is to the incorrect incoming port. Due to the incorrect information, the regenerator bank 406 can append its connectivity information and flag its partial connectivity in the SETUP message. Alternatively, the regenerator bank 406 could directly send a crankback message with the same information. That is, the SETUP can proceed to the destination node as in this example or immediately cranked back after the first node with partial connectivity.

At step 4, the SETUP message is forwarded from the regenerator bank 406 to the network portion 410. At step 5, the SETUP message is forwarded from the network portion 410 to the terminating node 404. At step 6, the terminating node 404 sends a crankback message with its partial connectivity, e.g., terminating node 404 CCMD1 is connected to WS Si. At step 7, the crankback message is forwarded from the regenerator bank 406 with its partial connectivity, and the partial connectivity of the terminating node 404, e.g., terminating node 404 CCMD1 is connected to WSS1 AND WSS1 is connected to the regenerator bank 406 which is connected to the WSS2. Finally, at step 8, the crankback message with the partial connectivity is provided back to the originating node 402. Thus, the partial connectivity is piggybacked in the crankback message.

In FIG. 9, the originating node 402 has set up a path 420 between its CCMD 1 and the CCMD 1 on the terminating node 404. At step 1, the originating node 402 sends a periodic PROBE REQUEST from the originating node 402 CCMD 1 to the terminating node 404 CCMD 1. At step 2, the terminating node 404 sends a PROBE response from the terminating node 404 CCMD 1 to the originating node 402 CCMD 1 with the connectivity information (updated) for the partial connectivity at the terminating node 404 and the regenerator bank 406.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of path computation and setup via a control plane in a network with partial connectivity in a photonic layer, the method comprising:
   responsive to one or more nodes in the photonic layer having partial connectivity, receiving connectivity information of the one or more nodes in signaling messages at an originating node providing setup messages;
   storing the connectivity information of the one or more nodes and utilizing the connectivity information for path computation;
   after path setup of a service through the one or more nodes, periodically sending probe signaling messages over the service; and
   receiving probe response messages containing updated connectivity information of the one or more nodes and storing the updated connectivity information.

2. The method of claim 1, further comprising:
   updating one or more protect routes for the service based on the updated connectivity information.

3. The method of claim 1, wherein the partial connectivity comprises a direct attach port which is an Optical Channel (OCH) which is not connected to all Optical Multiplex Section (OMS) ports at a node.

4. The method of claim 1, wherein the partial connectivity comprises regenerator banks with constrained connectivity in the photonic layer.

5. The method of claim 1, wherein photonic layer topology comprising drop port connectivity is not flooded in the control plane.

6. The method of claim 1, wherein the periodically sending is sent on an order of several minutes.

7. The method of claim 1, further comprising:
prior to providing the setup messages, performing path computation assuming full connectivity in the photonic layer; and
responsive to the receiving connectivity information of the one or more nodes with the partial connectivity, updating the path computation based on the connectivity information.

8. A node in a network with partial connectivity in a photonic layer, the node comprising:
one or more ports; and
a controller operating a control plane, communicatively coupled to the one or more ports, and configured to
responsive to one or more nodes in the photonic layer having partial connectivity, receive connectivity information of the one or more nodes in signaling messages responsive to sent setup messages;
store the connectivity information of the one or more nodes and utilize the connectivity information for path computation;
after path setup of a service through the one or more nodes, periodically send probe signaling messages over the service; and
receive probe response messages containing updated connectivity information of the one or more nodes and store the updated connectivity information.

9. The node of claim 8, wherein the controller is further configured to
update one or more protect routes for the service based on the updated connectivity information.

10. The node of claim 8, wherein the partial connectivity comprises a direct attach port which is an Optical Channel (OCH) which is not connected to all Optical Multiplex Section (OMS) ports at a node.

11. The node of claim 8, wherein the partial connectivity comprises regenerator banks with constrained connectivity in the photonic layer.

12. The node of claim 8, wherein photonic layer topology comprising drop port connectivity is not flooded in the control plane.

13. The node of claim 8, wherein the periodically sending is sent on an order of several minutes.

14. The node of claim 8, wherein the controller is further configured to
prior to providing the setup messages, performing path computation assuming full connectivity in the photonic layer; and
responsive to the receiving connectivity information of the one or more nodes with the partial connectivity, updating the path computation based on the connectivity information.

15. A network with partial connectivity in a photonic layer, the network comprising:
an originating node;
one or more intermediate nodes; and
a terminating node communicatively coupled to the originating node and the one or more intermediate nodes,
wherein, responsive to one or more nodes in the photonic layer having partial connectivity of the one or more intermediate nodes or the terminating node, the originating node receives connectivity information of the one or more nodes in signaling messages responsive to sent setup messages,
wherein, the originating node stores the connectivity information of the one or more nodes and utilize the connectivity information for path computation,
wherein, after path setup of a service through the one or more nodes, the originating node periodically sends probe signaling messages over the service, and
wherein the originating node receives probe response messages containing updated connectivity information of the one or more nodes and stores the updated connectivity information.

16. The network of claim 15, wherein the originating node is configured to update one or more protect routes for the service based on the updated connectivity information.

17. The network of claim 15, wherein the partial connectivity comprises a direct attach port which is an Optical Channel (OCH) which is not connected to all Optical Multiplex Section (OMS) ports at a node.

18. The network of claim 15, wherein the partial connectivity comprises regenerator banks with constrained connectivity in the photonic layer.

19. The network of claim 15, wherein photonic layer topology comprising drop port connectivity is not flooded in the control plane.

20. The network of claim 15, wherein the originating node periodically sends probe signaling messages on an order of several minutes.

* * * * *